United States Patent
Wang et al.

(10) Patent No.: US 9,667,503 B2
(45) Date of Patent: May 30, 2017

(54) METHOD AND SYSTEM FOR DETECTING COMMON ATTRIBUTES OF NETWORK UPGRADES

(75) Inventors: Jia Wang, Randolph, NJ (US); Zihui Ge, Secaucus, NJ (US); Ajay Mahimkar, Woodbridge, NJ (US); Aman Shaikh, Berkley Heights, NJ (US); Jennifer Yates, Morristown, NJ (US); Yin Zhang, Austin, TX (US); Joanne Emmons, Howell, NJ (US)

(73) Assignees: AT & T Intellectual Property I, L.P., Atlanta, GA (US); Board of Regents, The University of Texas Systems, Austin, TX (US)

( * ) Notice: Subject to any disclaimer, the term of this patent is extended or adjusted under 35 U.S.C. 154(b) by 1124 days.

(21) Appl. No.: 12/887,855

(22) Filed: Sep. 22, 2010

(65) Prior Publication Data

US 2012/0072574 A1    Mar. 22, 2012

(51) Int. Cl.
*G06F 15/16* (2006.01)
*H04L 12/24* (2006.01)
*H04L 12/26* (2006.01)
*H04L 12/721* (2013.01)

(52) U.S. Cl.
CPC ........ *H04L 41/142* (2013.01); *H04L 43/0817* (2013.01); *H04L 43/0852* (2013.01); *H04L 45/70* (2013.01)

(58) Field of Classification Search
CPC ............... H04L 41/142; H04L 43/0817; H04L 43/0852; H04L 45/70
USPC .......................................................... 709/224
See application file for complete search history.

(56) References Cited

U.S. PATENT DOCUMENTS

| | | | |
|---|---|---|---|
| 2003/0028541 A1* | 2/2003 | Bradley | G06K 9/6228 |
| 2008/0114874 A1* | 5/2008 | Meir et al. | 709/224 |
| 2011/0029672 A1* | 2/2011 | Agneeswaran | 709/226 |
| 2012/0023221 A1* | 1/2012 | Dayan | 709/224 |

OTHER PUBLICATIONS

Mahimkar et al. Detecting the Performance Impact of Upgrades in Large Operational Networks. SIGCOMM'10, Aug. 30-Sep. 3, 2010, New Delhi, India. p. 303-314.*

* cited by examiner

*Primary Examiner* — Bryan Lee
(74) *Attorney, Agent, or Firm* — Fay Kaplun & Marcin, LLP

(57) ABSTRACT

A system and method identify a set of rules for determining a commonality of attributes across different behavior changes for a network. The system performs the method by receiving a set of data correlating network triggers to performance changes of one or more network devices. The set of data further includes an indication of a sign of the performance change for each of the network devices based on the triggers. The method further includes extracting a set of rules relating to a set of relationships between the triggers and the performance changes. The rules identify a commonality of the performance changes for multiple network devices based on the triggers.

17 Claims, 3 Drawing Sheets

METHOD AND SYSTEM FOR DETECTING COMMON ATTRIBUTES OF NETWORK UPGRADES

BACKGROUND

Networks continue to develop to support new functions, improve reliability and performance, and decrease operating costs. In order to support such development, the hardware, software, and configuration of such networks may periodically be upgraded. When such upgrades occur, networks should be monitored to determine the various ways that upgrades may affect network performance.

SUMMARY

The exemplary embodiments describe a method for identifying a set of rules for determining a commonality of attributes across different behavior changes for a network. The method includes receiving a set of data correlating network triggers to performance changes of one or more network devices, the set of data further including an indication of a sign of the performance change for each of the network devices based on the triggers and extracting a set of rules relating to a set of relationships between the triggers and the performance changes, wherein the rules identify a commonality of the performance changes for multiple network devices based on the triggers.

The exemplary embodiments further describe a system for identifying a set of rules for determining a commonality of attributes across different behavior changes for a network. The system having a memory device storing a set of data correlating network triggers to performance changes of one or more network devices, the set of data further including an indication of a sign of the performance change for each of the network devices based on the triggers. The system further having an analysis device receiving the set of data from the memory device and extracting a set of rules relating to a set of relationships between the triggers and the performance changes, wherein the rules identify a commonality of the performance changes for multiple network devices based on the triggers.

The exemplary embodiments also describe a non-transitory storage medium storing a set of instructions executable by a processor, to perform a method of identifying a set of rules for determining a commonality of attributes across different behavior changes for a network. The method is executed as a set of instructions that are operable to receive a set of data correlating network triggers to performance changes of one or more network devices, the set of data further including an indication of a sign of the performance change for each of the network devices based on the triggers and extract a set of rules relating to a set of relationships between the triggers and the performance changes, wherein the rules identify a commonality of the performance changes for multiple network devices based on the triggers.

DETAILED DESCRIPTION

Figure 1:
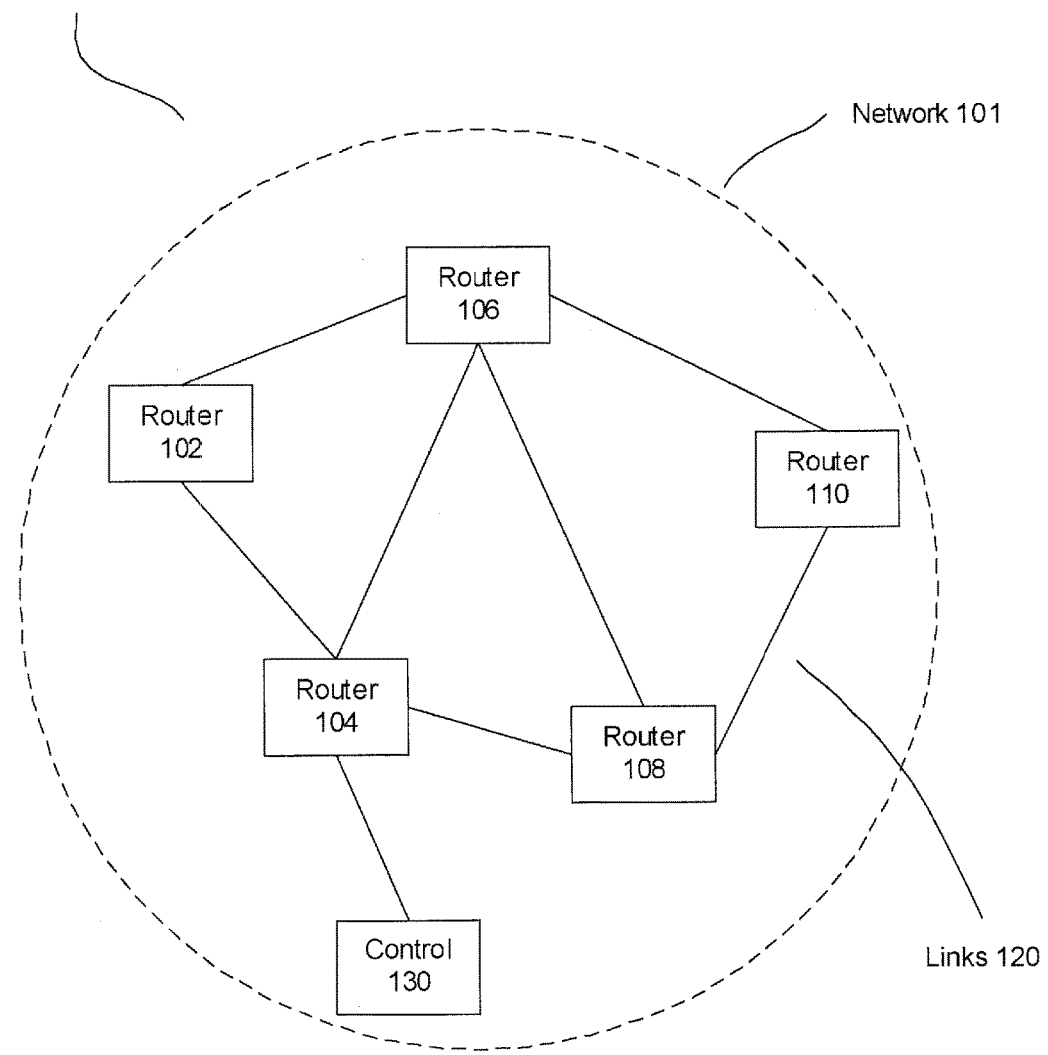
FIG. 1 shows an exemplary system.

The exemplary embodiments may be further understood with reference to the following description and the appended drawings, wherein like elements are referred to with the same reference numerals. The exemplary embodiments describe methods and systems for detecting network upgrades that may impact overall network performance.

Network providers may continually upgrade networks in order to support new functions and applications, improve performance and reliability, and decrease operational costs. These upgrades may be planned upgrades or they may be reactive upgrades that are the result of external network conditions, for example, Denial of Service (DoS) attacks or worm propagations. Possible upgrades may include the implementation of hardware, firmware or software, the introduction of new network or service features, and changes to network and/or device configuration. Typically, the changes are made one network element at a time (e.g., at a single router) and then applied across multiple network elements. While changes such as, for example, the introduction of new software governing the operation of a router may be tested in a controlled environment prior to implementation, such testing may not necessarily be able to accurately predict all possible results of implementation into a larger operational network environment. Thus, when such upgrades occur, it is important for overall network performance to be monitored in order to detect any unintended changes or results.

In an exemplary embodiment, the monitoring of the network may include the monitoring of different types of key performance indicators ("KPIs") at various points in the network. KPIs may include customer-perceived performance-related metrics (e.g., packet loss, delays, service glitches, etc.), network-related performance metrics (e.g., protocol flaps, line card crashes, etc.), and network element health (e.g., router CPU utilization, memory available, etc.). Monitoring may occur at routers or at various other points within a network. According to the exemplary embodiments, monitoring a behavior change in these KPIs may be a good indicator of whether the upgrades have had the desired impact or to discover any new or unexpected impacts caused by the upgrades. These behavior changes in a KPI may be termed a "change point." A behavior change may include a persistent change in network performance induced by a network trigger such as an upgrade. It should be noted that throughout this description, the term "trigger" may be used to characterize any event that materially alters the network. For example, a software upgrade may be a trigger. However, triggers are not limited to upgrades. The behavior change may be instantaneous and result immediately after the trigger (e.g., a KPI has an immediate level shift) or may also be gradual (e.g., a KPI slowly ramps up over time). Behavior changes may also correlate across multiple locations, typically induced by the same triggers applied across different network elements.

U.S. Pat. No. 8,774,023 describes exemplary systems and methods for monitoring KPI's of network devices, identifying relevant change points of these KPI's to determine changes in network performance and correlating these changes to triggers. The exemplary embodiments described below use the correlated trigger/change point data to identify if there is a commonality across different behavior changes. The trigger and change points form a correlated pair when they correlate in time and share the same location. For example, an operating system upgrade trigger and change points in router CPU utilization may be observable only on a specific group of routers that have the same OS version, model numbers and vendors. Thus, extracting common attributes for different changes may be helpful for the network operations team to determine the root causes of the changes in network behavior.

FIG. 1 illustrates an exemplary system 100. The system includes a plurality of routers 102, 104, 106, 108 and 110 that are connected to one another in a network 101. The network 101 includes a plurality of links 120 joining the routers to one another, but because the number and arrangement of these links 120 is extraneous to the scope of the exemplary embodiments, they are not identified individually in this disclosure. The network 101 may be a computing network, a communications network, etc. Those of skill in the art will understand that the number and arrangement of the routers is only exemplary and that an unlimited number of variations may be possible in other embodiments. The system 100 may also include a control point 130, at which a user may issue commands to the routers 102-110, performance measurements for the routers 102-110 may be received, etc. Those of skill in the art will understand that each of the routers 102-110 may include memory storing firmware and software, a processor executing the firmware and software, one or more network interfaces, etc; for clarity, these elements are not shown in FIG. 1. Those skilled in the art should also understand that an actual network may have many more types of components in addition to routers (e.g., network servers, network appliances, memory devices, etc.). However, for the purposes of describing the exemplary embodiments, the network 101 is simplified to include only the routers 102-110 and the control point 130.

There are multiple attributes that can be associated with the exemplary routers 102-110. Some exemplary attributes include location, operating system (OS) version, role, model, vendor, type of line cards, number of Border Gateway Protocol ("BGP") peers, uplink or downlink interfaces, customers, etc. As will be described in greater detail below, one of the challenges of identifying the common attributes for trigger/change point pairs is that a search in a multi-dimensional space of k attributes, where each attribute can take up to a maximum m values, results in $m^k$ possible combinations. Thus, where there are a large number of attributes, a brute force enumeration of the possibilities is not possible. The exemplary embodiments solve this issue by using a rule learner to automatically identify the common attributes as will be described in greater detail below.

Figure 2:
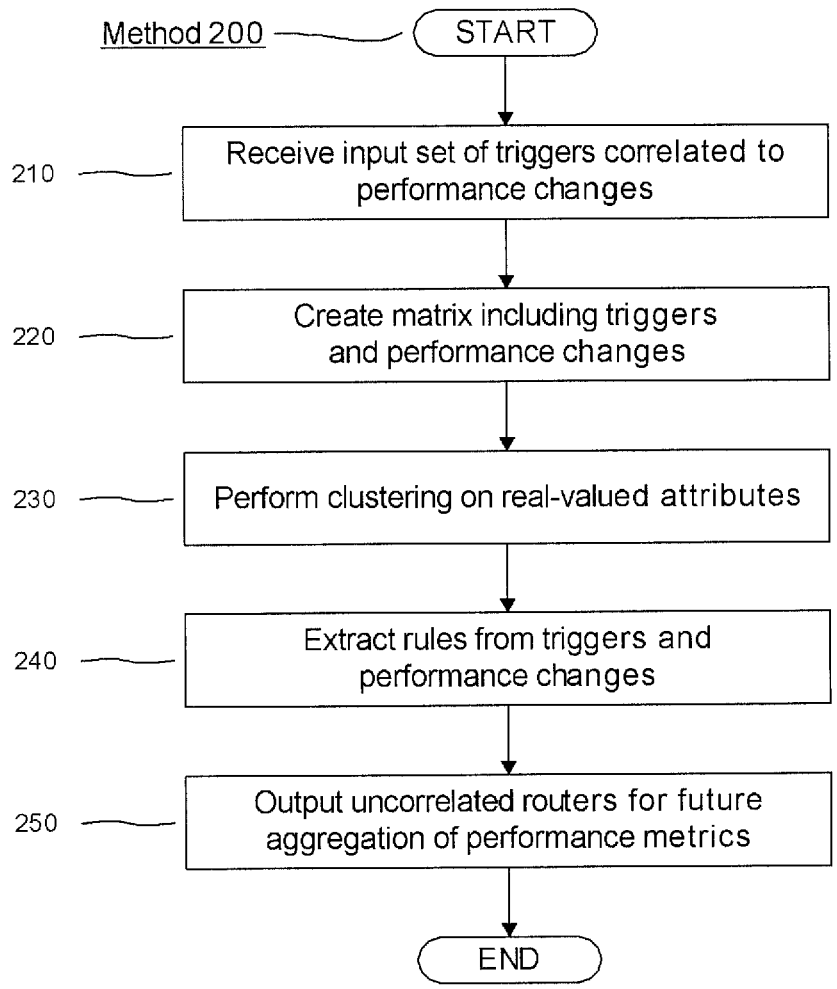
FIG. 2 illustrates an exemplary method for commonality detection for trigger/change point pairs that indicate network upgrade sessions with persistent network performance changes that may result from such upgrades.

FIG. 2 illustrates an exemplary method 200 for commonality detection for trigger/change point pairs that indicate network upgrade sessions with persistent network performance changes that may result from such upgrades. In step 210, a set of correlated triggers and performance changes are received. As described above, U.S. Pat. No. 8,774,023 describes exemplary systems and methods for monitoring KPI's of network devices, identifying relevant change points of these KPI's to determine changes in network performance and correlating these changes to triggers. Thus, in one exemplary embodiment, the data that is received is the correlated trigger/change point pairs from a system operating in accordance with the exemplary embodiments of the above-identified application. However, those skilled in the art will understand that the present exemplary embodiment is not limited to receiving input from such a system. Rather, the exemplary embodiment may receive the described input from any type of system. In particular, the correlated trigger/change point pairs identify a change in the behavior of the router that is caused by the identified trigger. Thus, the input received in step 210 is not limited to the described trigger/change point pairs, but may include any identification of the correlation of a trigger and a corresponding performance change caused by that trigger for the router.

In step 220, the triggers and performance changes are placed into a matrix that further encompasses, for each item, a router identifier and various details about the corresponding router. These details may include a location, an operating system version, a role, a model, a vendor, a type of line cards, a number of BGP peers, a number of uplink interfaces, a number of downlink interfaces, a number of customers, etc.

Figure 3:
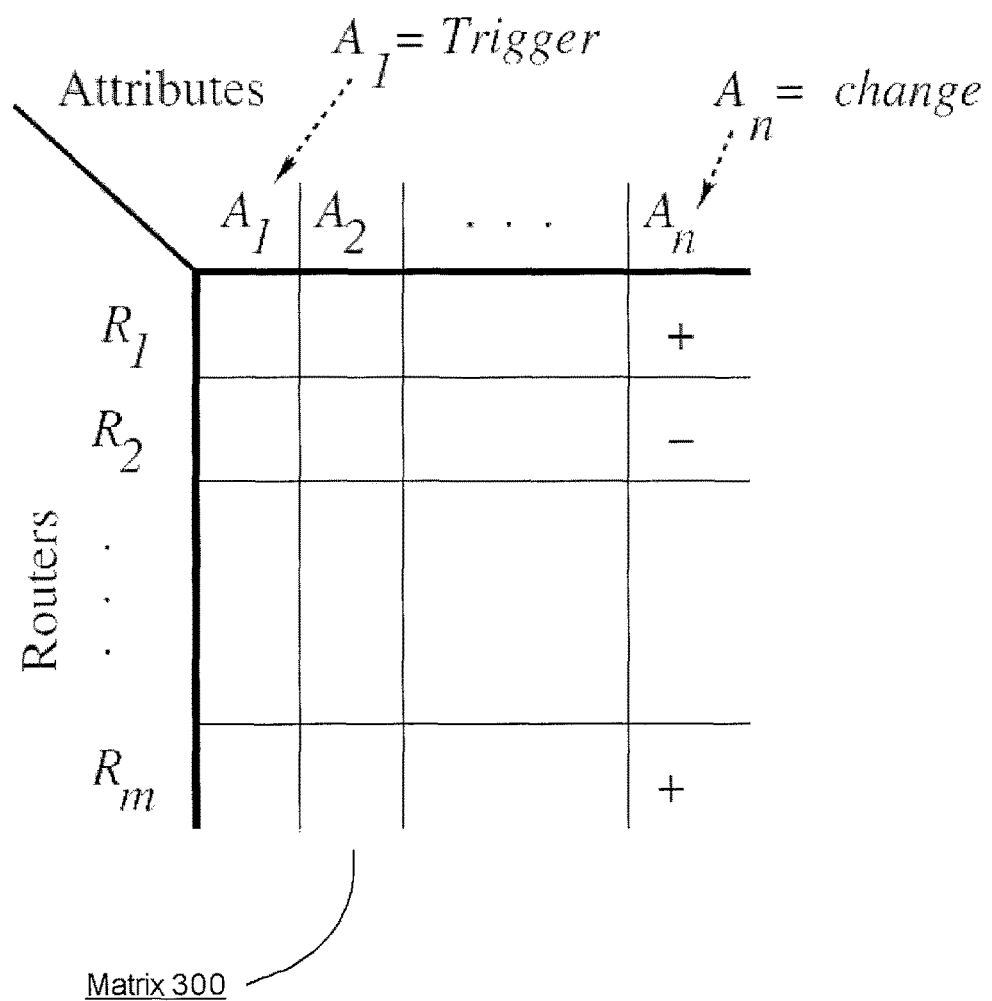
FIG. 3 shows an exemplary matrix containing routers, attributes, triggers and changes that may be used to correlate triggers with changes.

FIG. 3 illustrates an exemplary matrix 300 that may be created in step 220. In this matrix, each row may correspond to one router from $R_1$ to $R_m$. A first column may represent an identifier of a trigger corresponding to a change experienced by the router in each row. Further columns may represent various router attributes as described above. A last column may represent a sign (e.g., positive, negative, or no change) of the change observed due to the trigger in the first row. As will be apparent, the router attributes may be real-valued numbers or may have nominal values (e.g., strings). Nominal values may be used to represent attributes such as location, OS version, role, model, vendor and type of line cards; real numbers may be used to represent attributes such as number of routing sessions, number of customers, etc.

Because real-valued attributes can take many values, identifying commonalities may become more challenging. To address this challenge, in step 230, clustering is performed on each real-valued attribute to identify a small number of clusters. For example, some routers may have many BGP peers (e.g., peering routers), while others may have very few (e.g., core routers). Clustering may group these values into nominal values such as "less than x", "between x and y", and "greater than y". In one exemplary embodiment, this may be accomplished by k-means clustering.

Next, in step 240, rules are identified in the data set. These rules may take the form, for example, of "if (trigger=OS upgrade) and (vendor=XYZ) then positive change in memory" or "if (router role=border) and (trigger=BGP policy change) then positive change in CPU usage)". In one exemplary embodiment, this may be accomplished by a rule learning algorithm; in a preferred embodiment, this may be accomplished by a repeated incremental pruning to produce error reduction ("RIPPER") machine learning algorithm. These rules may provide an easy-to-interpret representation of triggers and resulting behavior changes across a network; this step may also eliminate coincidental co-occurrence. Thus, at the completion of step 240, the method has produced a set of rules that may then be used to identify the commonalities across different behavior changes, thereby allowing network operators to determine the root causes of the changes.

Step 250 presents an optional step that may be performed to identify routers that have not experienced performance changes that have been correlated with triggering activities. These uncorrelated routers are output so that they may be aggregated. This may enable the discovery of changes that may not be detectable at individual routers (e.g., due to background noise), but may be detected at higher aggregation levels (e.g., network-wide aggregation or aggregation across certain types of routers.) For example, a BGP policy change may result in a change in numbers of BGP timer expirations that may not be significant at each individual router, but may become significant across all peering routers in the network. This may increase the signal-to-noise ratio of genuine changes that are of interest to network maintenance personnel. Thus, the method of determining commonalitie among the routers may also identify those routers that are not correlated based on the common attributes. These uncorrelated routers may then be subject to a further aggregation analysis to determine if their KPI data does indicate any changes in network behavior based on being aggregated with KPI data from other routers. Exemplary embodiments of aggregation methods are described in U.S. Pat. No. 8,774,023.

By functioning as described above, the exemplary embodiments may detect commonalities between triggers that may have an impact on network performance, and performance changes that may have resulted from such triggers. These commonalities may take the form of logical rules that may be useful for network maintenance personnel to use in order to insure that good network performance is maintained. Such rules may also help understand why performance changes have occurred, in order that negative performance changes can be avoided in the course of planning and implementing future upgrades, in order that upgrades may be targeted to appropriate routers or groups of routers, and in order that positive performance changes may be duplicated during the course of future upgrades.

Those skilled in the art will understand that the above-described exemplary embodiments may be implemented in any number of manners, including, as a separate software module, as a combination of hardware and software, etc. For example, the method 200 may be a program containing lines of code that are stored on a non-transitory computer readable storage medium that, when compiled, may be executed by a processor. The computing device, which may be referred to as an analysis device, that includes such lines of code may be connected to the network 101, for example, the control point 130 may include the functionality described above or it may be a separate device that receives the data from the network 101 and performs the functionality described herein.

It will be apparent to those skilled in the art that various modifications may be made to the exemplary embodiments, without departing from their spirit or scope. Thus, it is intended that the present disclosure cover modifications and variations of the exemplary embodiments provided they come within the scope of the appended claims and their equivalents.

What is claimed is:

1. A method, comprising:
receiving, by an analysis device, a set of data correlating network triggers to performance changes of one or more network devices, the set of data further including an indication of a sign of the performance change for each of the network devices based on the triggers;
extracting, by the analysis device, a set of rules relating to a set of relationships between the triggers and the performance changes, wherein the rules identify a commonality of the performance changes for multiple network devices based on the triggers;
identifying, by the analysis device, a network device corresponding to each of the triggers; and
determining, by the analysis device, a set of attributes relating to each of the network devices,
wherein the set of rules further relates to the set of attributes,
wherein the extracting includes creating a matrix having the network devices for rows of the matrix, the triggers as one column, the attributes as a set of columns and the sign of the performance change as a further column.

2. The method of claim 1, wherein the set of attributes includes, for each of the network devices, one of a location, an operating system version, a role, a model, a vendor, a type of link cards, a number of Border Gateway Protocol peers, a number of uplink interfaces, a number of downlink interfaces, and a number of customers.

3. The method of claim 2, wherein the set of attributes includes a quantitative attribute having a real number value, further comprising:
clustering, by the analysis device, the attribute into a plurality of ranges of nominal values.

4. The method of claim 1, wherein the network devices include routers.

5. The method of claim 1, wherein the set of rules is extracted using a rule learning algorithm.

6. The method of claim 5, wherein the rule learning algorithm is a repeated incremental pruning to produce error reduction algorithm.

7. The method of claim 1, further comprising:
outputting, by the analysis device, a list of network devices that do not contribute to the extraction of the set of rules.

8. A system, comprising:
a memory device storing a set of data correlating network triggers to performance changes of one or more network devices, the set of data further including an indication of a sign of the performance change for each of the network devices based on the triggers; and
an analysis device receiving the set of data from the memory device and extracting a set of rules relating to a set of relationships between the triggers and the performance changes, wherein the rules identify a commonality of the performance changes for multiple network devices based on the triggers, the analysis device further identifying a network device corresponding to each of the triggers and determining a set of attributes relating to each of the network devices, wherein the set of rules further relates to the set of attributes, wherein the extracting includes creating a matrix having the network devices for rows of the matrix, the triggers as one column, the attributes as a set of columns and the sign of the performance change as a further column.

9. The system of claim 8, wherein the set of attributes includes, for each of the network devices, one of a location, an operating system version, a role, a model, a vendor, a type of link cards, a number of Border Gateway Protocol peers, a number of uplink interfaces, a number of downlink interfaces, and a number of customers.

10. The system of claim 8, wherein the set of attributes includes a quantitative attribute having a real number value, the analysis device clustering the attribute into a plurality of ranges of nominal values.

11. The system of claim 8, wherein the network devices include routers.

12. The system of claim 8, wherein the analysis device includes a rule learning algorithm for extracting the set of rules.

13. A non-transitory computer readable storage medium storing a set of instructions executable by a processor, the set of instructions, when executed by the processor, causing the processor to perform operations comprising:
receiving a set of data correlating network triggers to performance changes of one or more network devices, the set of data further including an indication of a sign of the performance change for each of the network devices based on the triggers;

extracting a set of rules relating to a set of relationships between the triggers and the performance changes, wherein the rules identify a commonality of the performance changes for multiple network devices based on the triggers;

identifying, by the analysis device, a network device corresponding to each of the triggers; and determining, by the analysis device, a set of attributes relating to each of the network devices,
   wherein the set of rules further relates to the set of attributes,
   wherein the extracting includes creating a matrix having the network devices for rows of the matrix, the triggers as one column, the attributes as a set of columns and the sign of the performance change as a further column.

14. The non-transitory computer readable storage medium of claim 13, wherein the set of attributes includes, for each of the network devices, one of a location, an operating system version, a role, a model, a vendor, a type of link cards, a number of Border Gateway Protocol peers, a number of uplink interfaces, a number of downlink interfaces, and a number of customers.

15. The non-transitory computer readable storage medium of claim 13, wherein the operations further comprise:
   clustering the attribute into a plurality of ranges of nominal values, when the attribute has a real number value.

16. The non-transitory computer readable storage medium of claim 13, wherein the operations further comprise:
   outputting a list of network devices that do not contribute to the extraction of the set of rules.

17. The non-transitory computer readable storage medium of claim 13, wherein the set of rules is extracted using a rule learning algorithm that is a repeated incremental pruning to produce error reduction algorithm.

\* \* \* \* \*